United States Patent
Ruzich et al.

(10) Patent No.: US 10,794,097 B2
(45) Date of Patent: Oct. 6, 2020

(54) COMPARTMENT COVER RELEASE SYSTEM AND METHOD

(71) Applicant: Illinois Tool Works Inc., Glenview, IL (US)

(72) Inventors: Justin L. Ruzich, Frankfort, IL (US); Mehmet T. Acunal, Schererville, IN (US)

(73) Assignee: Illinois Tool Works Inc., Glenview, IL (US)

( * ) Notice: Subject to any disclaimer, the term of this patent is extended or adjusted under 35 U.S.C. 154(b) by 115 days.

(21) Appl. No.: 16/037,030

(22) Filed: Jul. 17, 2018

(65) Prior Publication Data

US 2019/0040663 A1 Feb. 7, 2019

Related U.S. Application Data

(60) Provisional application No. 62/541,159, filed on Aug. 4, 2017.

(51) Int. Cl.
| | |
|---|---|
| *E05C 3/16* | (2006.01) |
| *B60R 7/04* | (2006.01) |
| *E05B 83/30* | (2014.01) |
| *E05C 9/04* | (2006.01) |
| *E05B 5/00* | (2006.01) |
| *E05B 63/00* | (2006.01) |

(52) U.S. Cl.
CPC .............. *E05C 3/162* (2013.01); *B60R 7/04* (2013.01); *E05B 5/00* (2013.01); *E05B 83/30* (2013.01); *E05C 9/04* (2013.01); *E05B 63/0052* (2013.01)

(58) Field of Classification Search
CPC ... E05C 3/162; E05C 9/04; E05B 5/00; E05B 83/30; E05B 63/0052; B60R 7/04

USPC .............. 296/37.8, 24.34, 37.1, 37.12
See application file for complete search history.

(56) References Cited

U.S. PATENT DOCUMENTS

| | | | | |
|---|---|---|---|---|
| 2004/0168487 A1* | 9/2004 | Sawatani | ........... | B60R 7/06 70/145 |
| 2004/0256859 A1* | 12/2004 | Yamada | ........... | E05B 83/30 292/32 |
| 2009/0206625 A1* | 8/2009 | Toppani | ........... | B60R 7/06 296/37.12 |
| 2011/0174027 A1* | 7/2011 | Ookawara | ........... | E05B 83/30 70/159 |

(Continued)

FOREIGN PATENT DOCUMENTS

WO    WO 2018/008597    1/2018

OTHER PUBLICATIONS

Extended European Search Report for EP 18185250.1-1005, dated Sep. 27, 2018.

*Primary Examiner* — Jason S Morrow
*Assistant Examiner* — E Turner Hicks
(74) *Attorney, Agent, or Firm* — Quarles & Brady LLP

(57) ABSTRACT

A compartment cover release system is configured to selectively latch and unlatch a cover of a compartment. The compartment cover release system includes a housing, and a lid sub-assembly coupled to the housing. The lid sub-assembly includes a handle that is configured to be pivoted between an open position and a closed position. A cam is coupled to one or both of the housing and the lid sub-assembly. The cam includes a central hub connected to one or more legs. The leg(s) are configured to move in response to rotation of the central hub.

19 Claims, 16 Drawing Sheets

(56) References Cited

U.S. PATENT DOCUMENTS

2014/0150505 A1* 6/2014 Shimizu .................... E05D 1/04
 70/344
2014/0152026 A1* 6/2014 Cinco ..................... E05B 83/28
 292/158

* cited by examiner

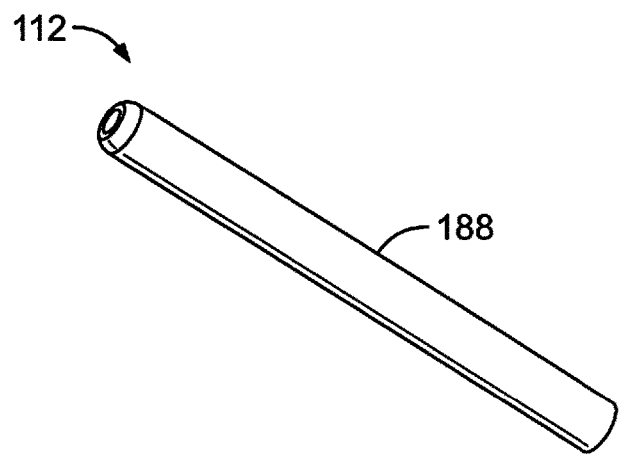
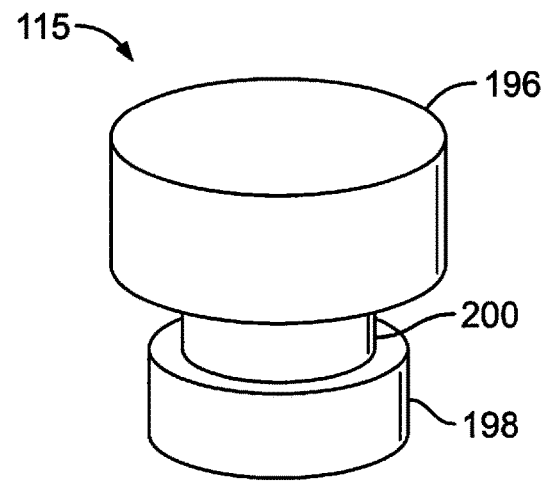
FIG. 6  FIG. 8
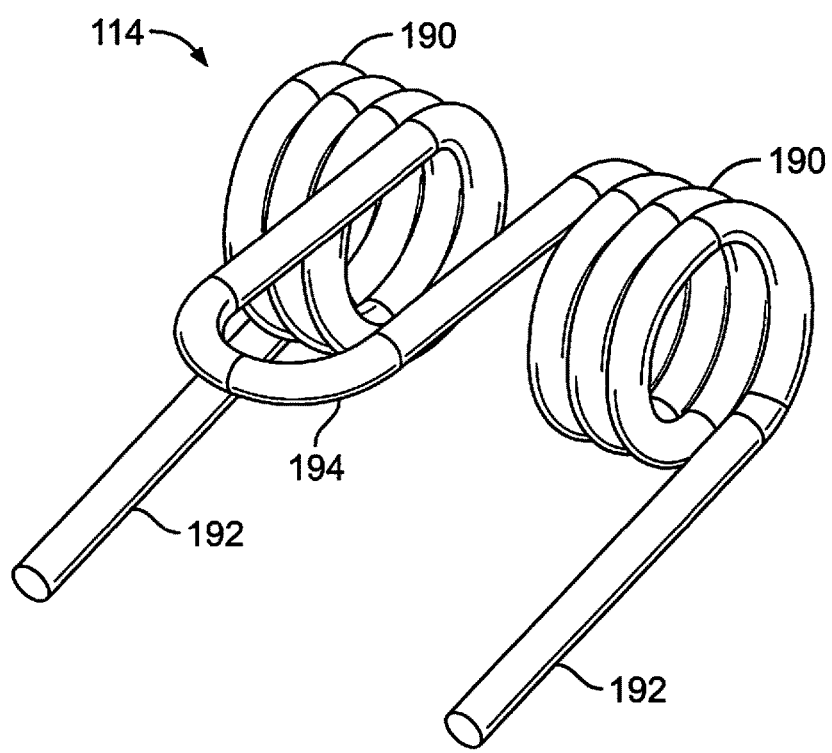
FIG. 7

COMPARTMENT COVER RELEASE SYSTEM AND METHOD

RELATED APPLICATIONS

This application relates to and claims the benefit of U.S. Provisional Patent Application No. 62/541,159, entitled "Compartment Cover Release System," filed Aug. 4, 2017, which is hereby incorporated by reference in its entirety.

FIELD OF EMBODIMENTS OF THE DISCLOSURE

Embodiments of the present disclosure generally relate to a system and method for opening a cover (such as a door, panel, lid, or the like) of a compartment, and, more particularly, to a compartment cover release system and method for releasing a cover of a compartment from a latched or other such closed position.

BACKGROUND

Various compartments are configured to be selectively opened and closed. For example, a glove compartment within a vehicle is configured to be opened so that one or more items may be stored therein, and then closed to securely retain the item(s). A typical compartment includes a main housing and a cover (such as a door, panel, lid, or the like) that is moveably secured to the main housing between an open position and a closed position. For example, the cover may be pivotally secured to the main housing. The door includes a securing member, such as a latch, that cooperates with a complementary structure of the main housing to ensure that the cover is secured in the closed position.

A typical release or opening system for a compartment includes numerous parts. As such, the process of assembling the compartment may be time and labor intensive.

SUMMARY OF EMBODIMENTS OF THE DISCLOSURE

A need exists for an efficient and simple compartment cover release system. Further, a need exists for a compartment cover release system that may be quickly, easily, and efficiently manufactured.

With those needs in mind, certain embodiments of the present disclosure provide a compartment cover release system that is configured to selectively latch and unlatch a cover of a compartment. The compartment cover release system includes a housing, and a lid sub-assembly coupled to the housing. The lid sub-assembly includes a handle that is configured to be pivoted between an open position and a closed position. A cam is coupled to one or both of the housing and the lid sub-assembly. The cam includes a central hub connected to one or more legs (such as a first leg and a second leg, for example). The leg(s) are configured to move in response to rotation of the central hub. The central hub may be configured to rotate as the handle pivots between the open position and the closed position.

The lid sub-assembly may include a covering lid. The handle may be pivotally coupled to the covering lid. In at least one embodiment, a stem of the handle extends through a stem opening formed through a covering panel of the covering lid when the handle is in the closed position.

The lid sub-assembly may include a spring that is configured to bias the handle into the closed position. The lid sub-assembly may include a bumper that contacts the handle in the closed position.

The housing may include a retaining wall including a central hub portion that defines a cam hub retaining area that retains the central hub, and one or more leg portions that define one or more leg retaining areas that retain the one or more legs. The housing may also include a central boss. In at least one embodiment, the central hub is rotatably secured around the central boss.

The leg(s) may include clamping prongs that are configured to securely engage a portion of the handle in the closed position. The portion of the handle may be a distal end of the stem.

The leg(s) may include one or more latch ends that are configured to be retained by one or more reciprocal latching members of the compartment when the handle is in the closed position.

Certain embodiments of the present disclosure provide a compartment including a main retaining housing defining an internal retaining chamber, a door moveably coupled to the main retaining housing, and a compartment cover release system coupled to one or both of the main retaining housing and the door. The compartment cover release system is configured to selectively latch and unlatch the door in relation to the main retaining housing.

BRIEF DESCRIPTION OF SEVERAL VIEWS OF THE DRAWINGS

FIG. 6 illustrates a perspective view of a pivot pin, according to an embodiment of the present disclosure.

FIG. 7 illustrates a perspective view of a spring, according to an embodiment of the present disclosure.

FIG. 8 illustrates a perspective view of a bumper, according to an embodiment of the present disclosure.

Figure 1:
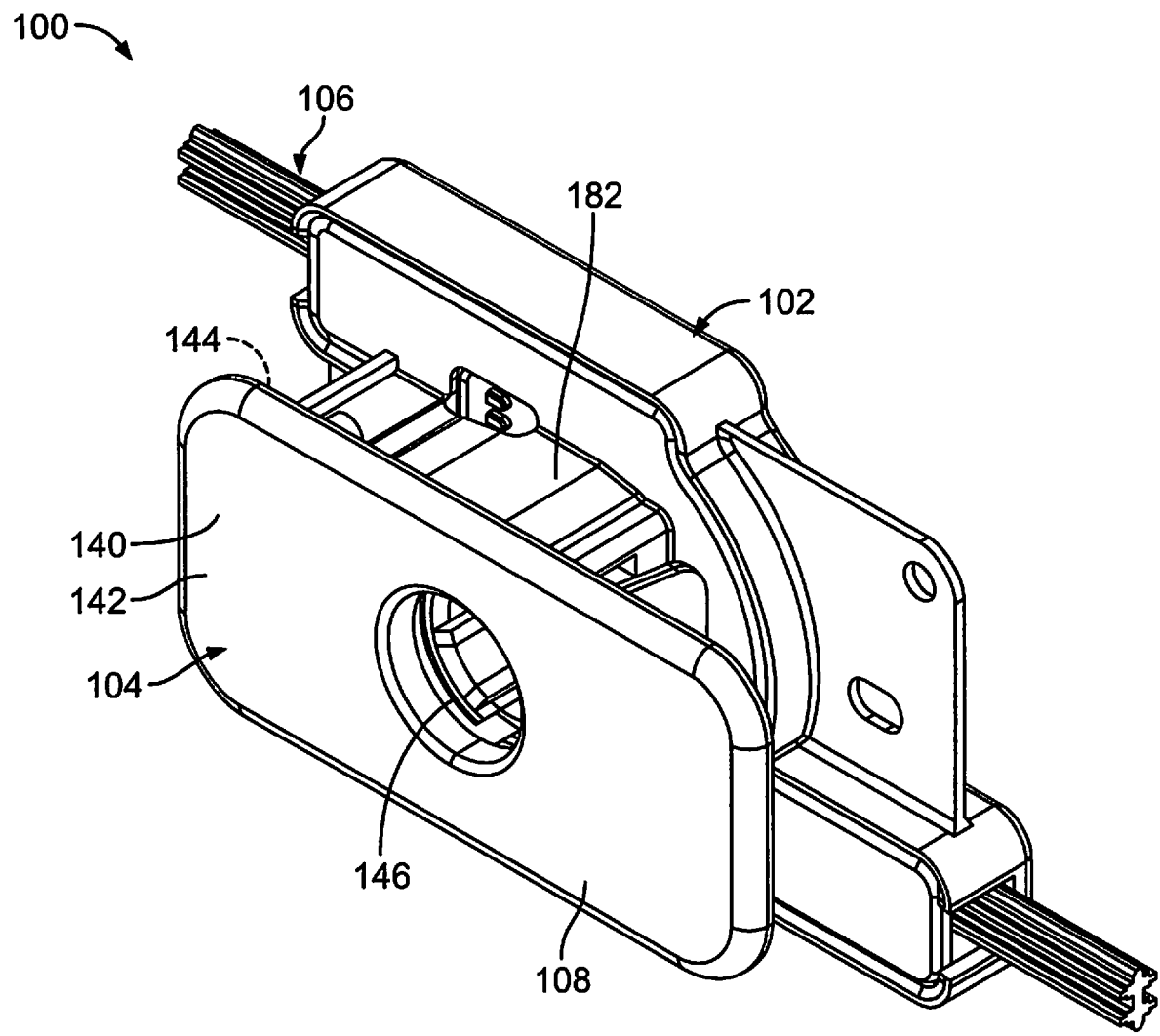
FIG. 1 illustrates a perspective front view of a compartment cover release system, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a compartment cover release system and method that provides a single living hinge cam actuation, which is configured to release the cover of compartment. The compartment cover release system eliminates, minimizes, or otherwise reduces the need for additional components, while still being able to move strikers into position to release the cover in the storage compartment.

The compartment cover release system provides a one piece living hinge cam that may be embedded in one or both of a housing and/or cover of a compartment. When the cam rotates around a pivot, the cam causes two legs to move inwardly and/or outwardly. When the cam rotates about the pivot, living hinges that connect the cam to the legs pull inwardly and/or outwardly, and flex as the distance between the legs decreases. The living hinge connection between the cam and the legs eliminates or otherwise reduces the need for additional assembly equipment and extra parts in the overall assembly. A handle and one piece living hinge cam is configured such that when the handle is pulled, a stem of the handle pushes on a support leg that forces the cam to rotate around the pivot, thereby forcing one or both legs inward.

Compared to known releasing mechanisms, the compartment cover release system provides a simplified assembly. Assembly times and inventory are reduced. No additional parts are needed.

Figure 2:
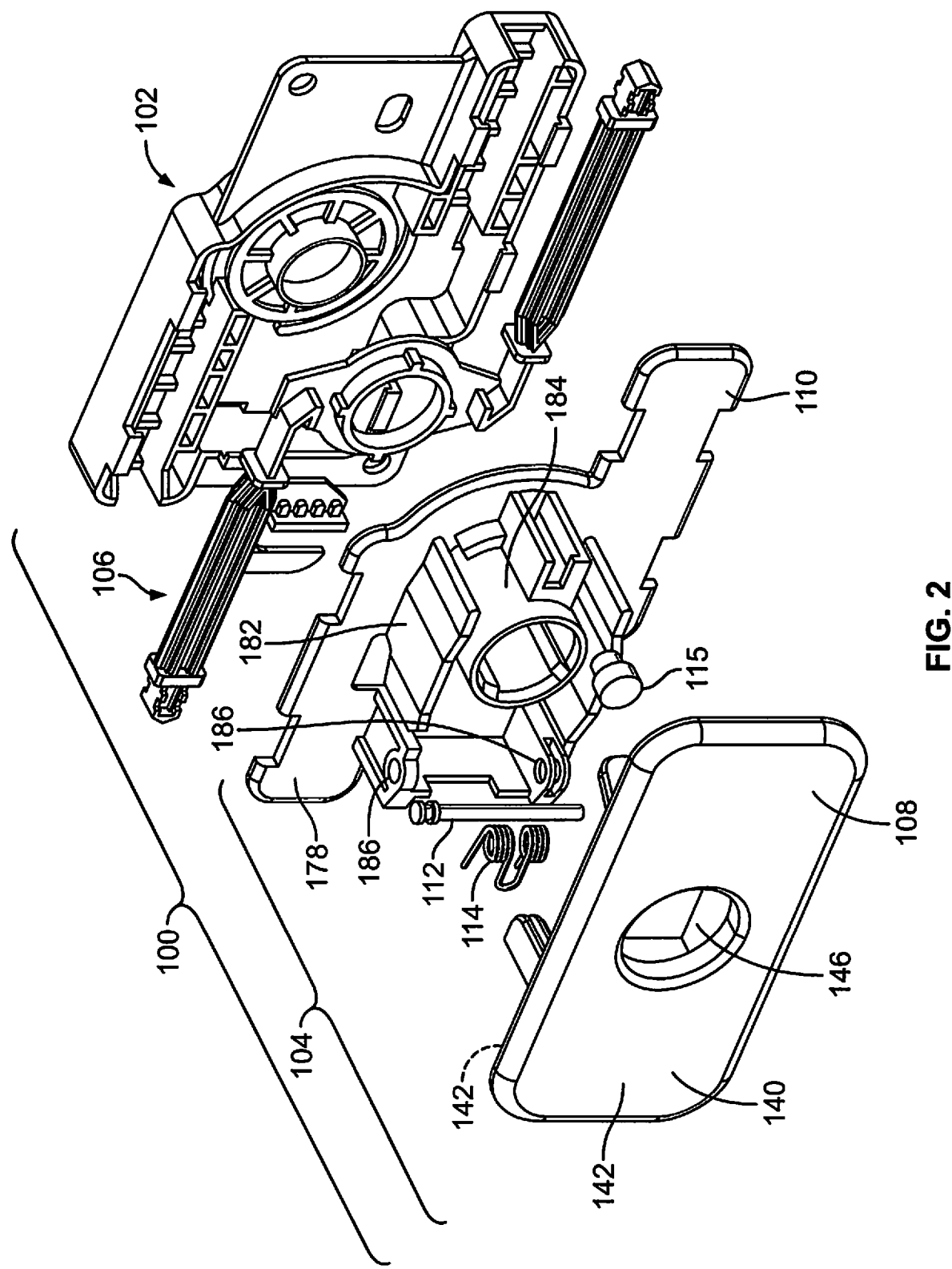
FIG. 2 illustrates a perspective front exploded view of the compartment cover release system.

FIG. 1 illustrates a perspective front view of a compartment cover release system 100, according to an embodiment of the present disclosure. FIG. 2 illustrates a perspective front exploded view of the compartment cover release system 100. Referring to FIGS. 1 and 2, the compartment cover release system 100 includes a housing 102 and a lid sub-assembly 104 coupled to the housing 102. A cam 106 is moveably secured to the housing 102 and the lid sub-assembly 104.

The lid sub-assembly 104 includes a handle 108 that is moveably coupled to a covering lid 110. A pivot pin 112 may pivotally secure the handle 108 to the covering lid 110. A spring 114 having a spring force constant is coupled to the pivot pin 112 and the handle 108, and the spring 114 is further configured to bias the handle 108 into a closed position with respect to the covering lid 110. Optionally, the lid sub-assembly 104 may not include the spring 112.

A bumper 115 may be secured to the lid sub-assembly 104 and configured to contact a portion of the handle 108 when the handle 108 is in a closed position. The bumper 115 is configured to dampen vibrations and control noise that may be caused by the handle 108 closing onto the covering lid 110.

Figure 3:
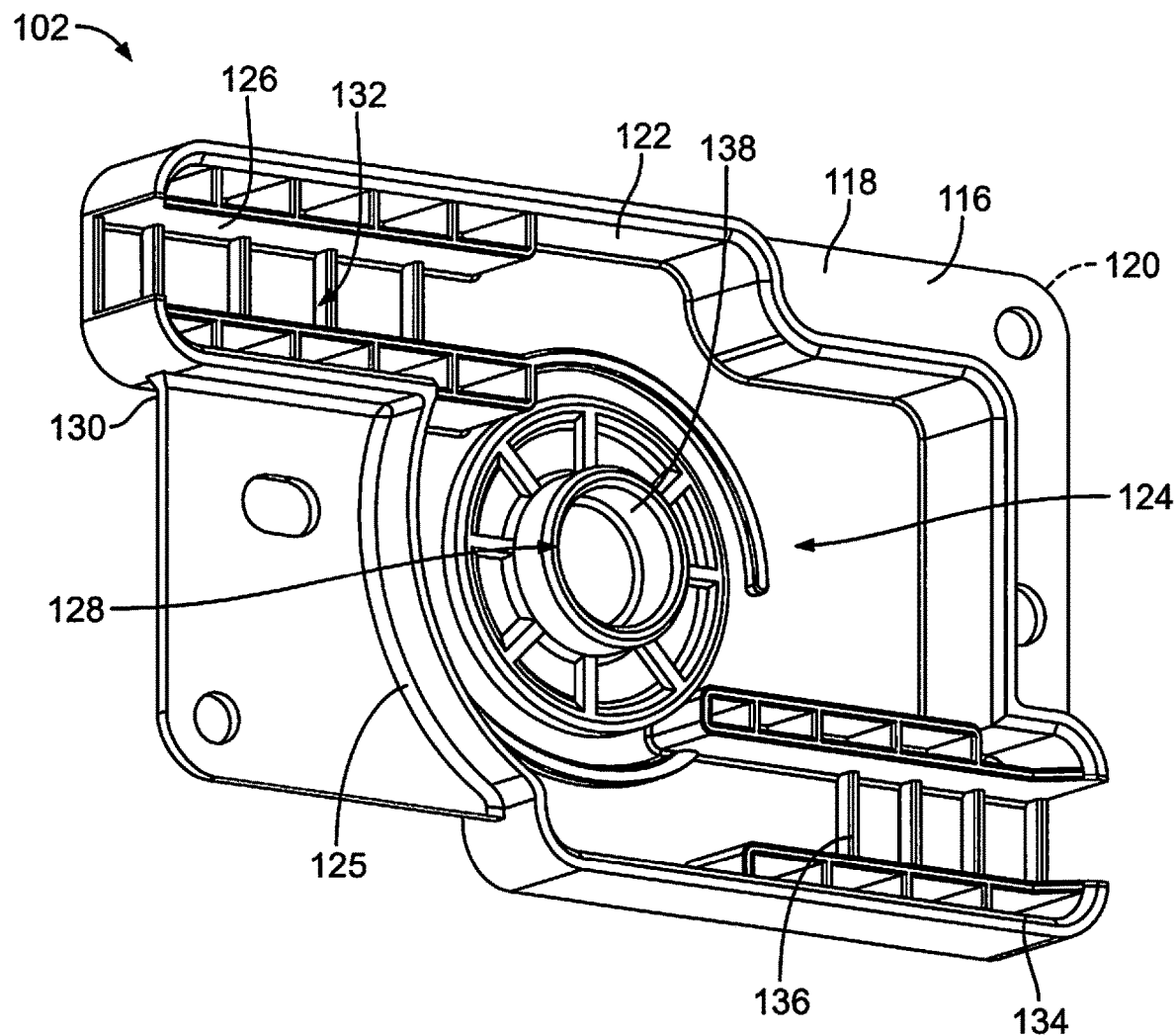
FIG. 3 illustrates a perspective front view of a housing, according to an embodiment of the present disclosure.

FIG. 3 illustrates a perspective front view of the housing 102, according to an embodiment of the present disclosure. The housing 102 includes a planar support wall 116 having a first or front surface 118 opposite from a second or rear surface 120. A retaining wall 122 extends outwardly from the first surface 118 and defines a cam-retaining chamber 124. The retaining wall 122 may correspond to a shape of an outer peripheral portion of the cam 106 (shown in FIGS. 1 and 2) or may be configured in any other suitable manner that would enable the cam 106 to fit within the retaining wall 122. The retaining wall 122 includes a central hub portion 125 that defines a cam hub retaining area 128, a first or upper leg portion 130 that defines a first leg retaining area 132, and a second or lower leg portion 134 that defines a second leg retaining area 136. As shown, the first leg retaining area 132 and the second leg retaining area 136 are at different heights and extend in opposite directions.

A central boss 138 (such as a circular rim) extends outwardly from the first surface 118. The central boss 138 may be at or near a center of the housing 102. Optionally, the boss 138 may be offset from the center of the housing 102.

Figure 4:
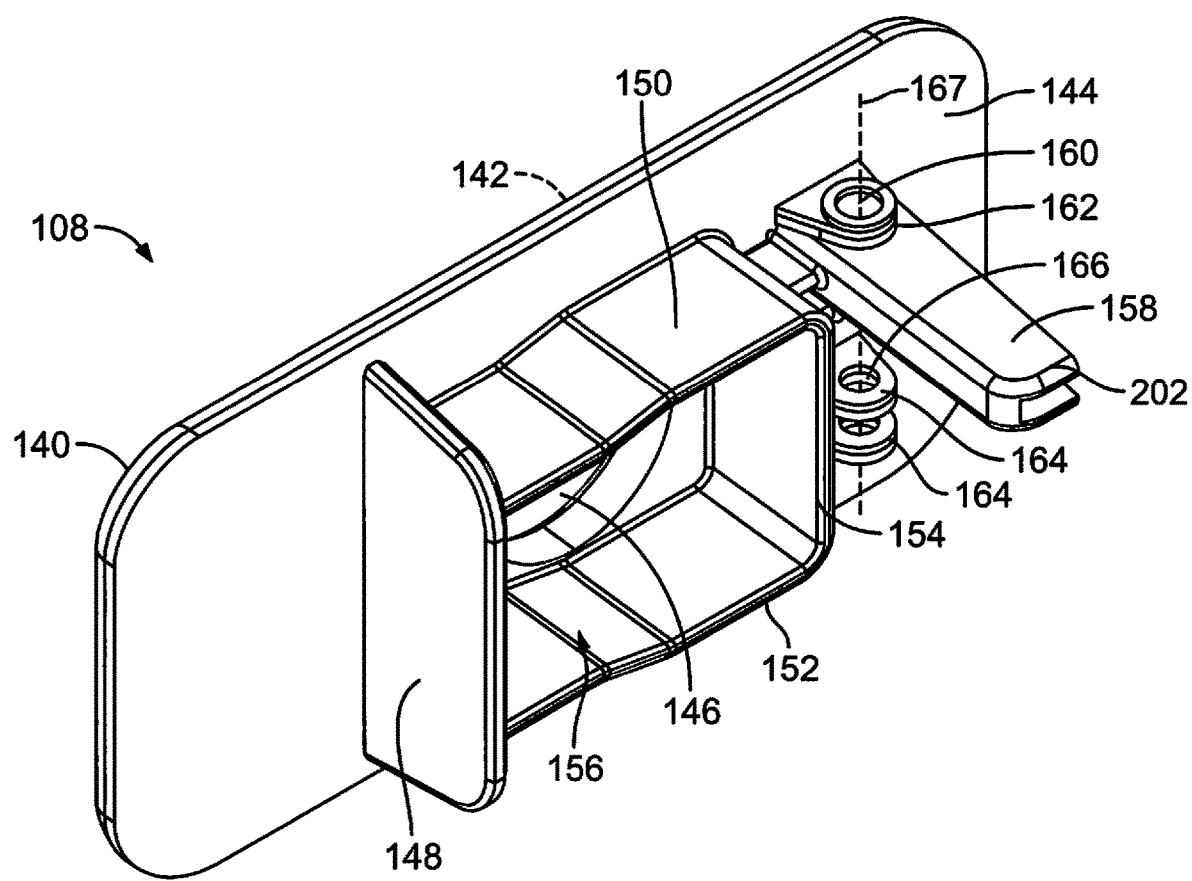
FIG. 4 illustrates a perspective rear view of a handle, according to an embodiment of the present disclosure.

FIG. 4 illustrates a perspective rear view of the handle 108, according to an embodiment of the present disclosure. Referring to FIGS. 1, 2, and 4, the handle 108 includes a panel 140 having a front surface 142 opposite from a rear surface 144. A central opening 146 may be formed through the panel 140 between and through the front surface 142 and the rear surface 144. The central opening 146 may be configured to receive an retain an optional key lock cylinder, and/or provide an opening to allow an individual to grasp the handle 108 and pivot between open and closed positions relative to the covering lid 110. Optionally, the handle 108 may not include the central opening 146. In at least one other embodiment, instead of a central opening, the handle 108 may include a protuberance (for example, a bar, knob, fin, or the like) that is configured to be grasped.

A first lateral wall 148 extends outwardly from the rear surface 144. The first lateral wall 148 is coupled to an upper wall 150 and a lower wall 152 that extend from the rear surface 144. The upper wall 150 and the lower wall 152 are coupled to a second lateral wall 154 that is opposite from the first lateral wall 148. An internal chamber 156 is defined between the rear surface 144, the first lateral wall 148, the upper wall 150, the lower wall 152, and the second lateral wall 154. The internal chamber 156 is coupled to the central opening 146.

A stem 158 extends outwardly from the rear surface 144 on one side of the second lateral wall 154. The stem 158 may have a height that is the same as or proximate to a height of the upper wall 150. The stem 158 includes a pin through-hole 160 at a base 162 proximate to the rear surface 144. One or more pin collars 164 defining pin through-holes 166 may extend from the rear surface 144 below the pin through-hole 160 of the stem 158. The through-holes 164 and 166 are aligned along axis 167 and are configured to receive and retain portions of the pivot pin 112.

Figure 5:
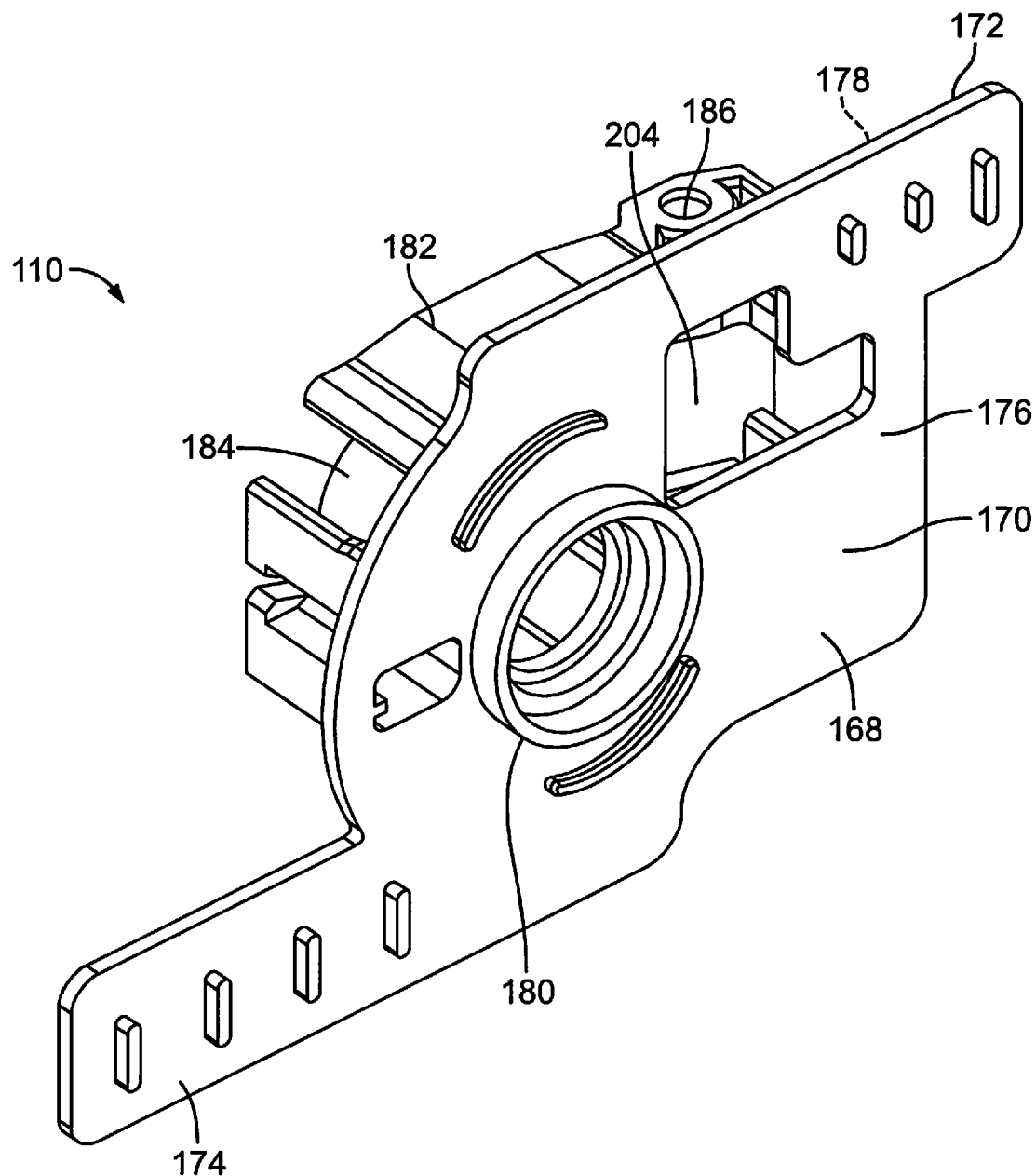
FIG. 5 illustrates a perspective rear view of a covering lid, according to an embodiment of the present disclosure.

FIG. 5 illustrates a perspective rear view of the covering lid 110, according to an embodiment of the present disclosure. Referring to FIGS. 1, 2, and 5, the covering lid 110 includes a covering panel 168 including a central covering portion 170, a first leg covering portion 172 extending in a first direction from the central covering portion 170, and a second leg covering portion 174 extending in a second direction from the central covering portion 170. In some embodiment, the first and second directions are opposite one another. The covering panel 168 may generally be sized and shaped to correspond to a shape of the housing 102.

The covering panel 168 includes a rear surface 176 opposite from a front surface 178. A central rim 180 extends outwardly from the rear surface 176. A boundary wall 182 extends outwardly from the front surface 178. A tubular wall 184 extends from the front surface 178 within the boundary defined by the boundary wall 182.

Pin through-holes 186 are formed through portions of the boundary wall 182. The pin through-holes 186 are axially aligned with one another, and are configured to receive and pivotally retain portions of the pivot pin 112.

FIG. 6 illustrates a perspective view of the pivot pin 112, according to an embodiment of the present disclosure. The pivot pin 112 includes a longitudinal cylindrical shaft 188. Referring to FIGS. 2, 4, 5, and 6, the covering lid 110 is secured to the handle 108, such that the pin through-holes 160 and 164 of the handle 108 are aligned along the axis 167 with the pin through-holes 186 of the covering lid 110. The pin 112 is inserted into the axially aligned pin through-holes 160, 164, and 186 to pivotally couple the handle 108 to the covering lid 110.

FIG. 7 illustrates a perspective view of the spring 114, according to an embodiment of the present disclosure. The spring 114 includes one or more coiled sections 190 that connect to straightened protuberances 192. A central arcuate section 194 may extend between two coiled sections 190. Referring to FIGS. 2, 6, and 7, the coiled sections 190 may be positioned around the shaft 188 of the pivot pin 112, while the protuberances 192 and/or the arcuate section 194 may abut into surfaces of the handle 108 and/or the covering lid 110 (such as indicated in FIG. 2, for example), thereby causing the spring 114 to exert a force relative to the handle 108 and the covering lid 110 that biases the handle 108 into a closed position. Alternatively, the compartment cover release system 100 may not include the spring 114.

FIG. 8 illustrates a perspective view of the bumper 115, according to an embodiment of the present disclosure. The bumper 115 may be formed of rubber or other such elastomeric material, and may include an enlarged head 196 coupled to a retaining stud 198 through a reduced diameter or width neck 200. In some embodiment, a diameter or width of the enlarged head 196 may be greater than a diameter of the retaining stud 198. Referring to FIGS. 2 and 8, the retaining stud 198 is retained within a reciprocal portion (for example, a recessed retaining channel, securing collar, and/ or the like) of the covering lid 110, and/or is secured to the covering lid 110 through adhesives, for example. The enlarged head 196 is directed towards the handle 108. The bumper 115 absorbs kinetic energy of the handle 108 as the handle 108 is closed onto the covering lid 110, thereby dampening vibration and reducing noise. Alternatively, the compartment cover release system 100 may not include the bumper 115.

Figure 9:
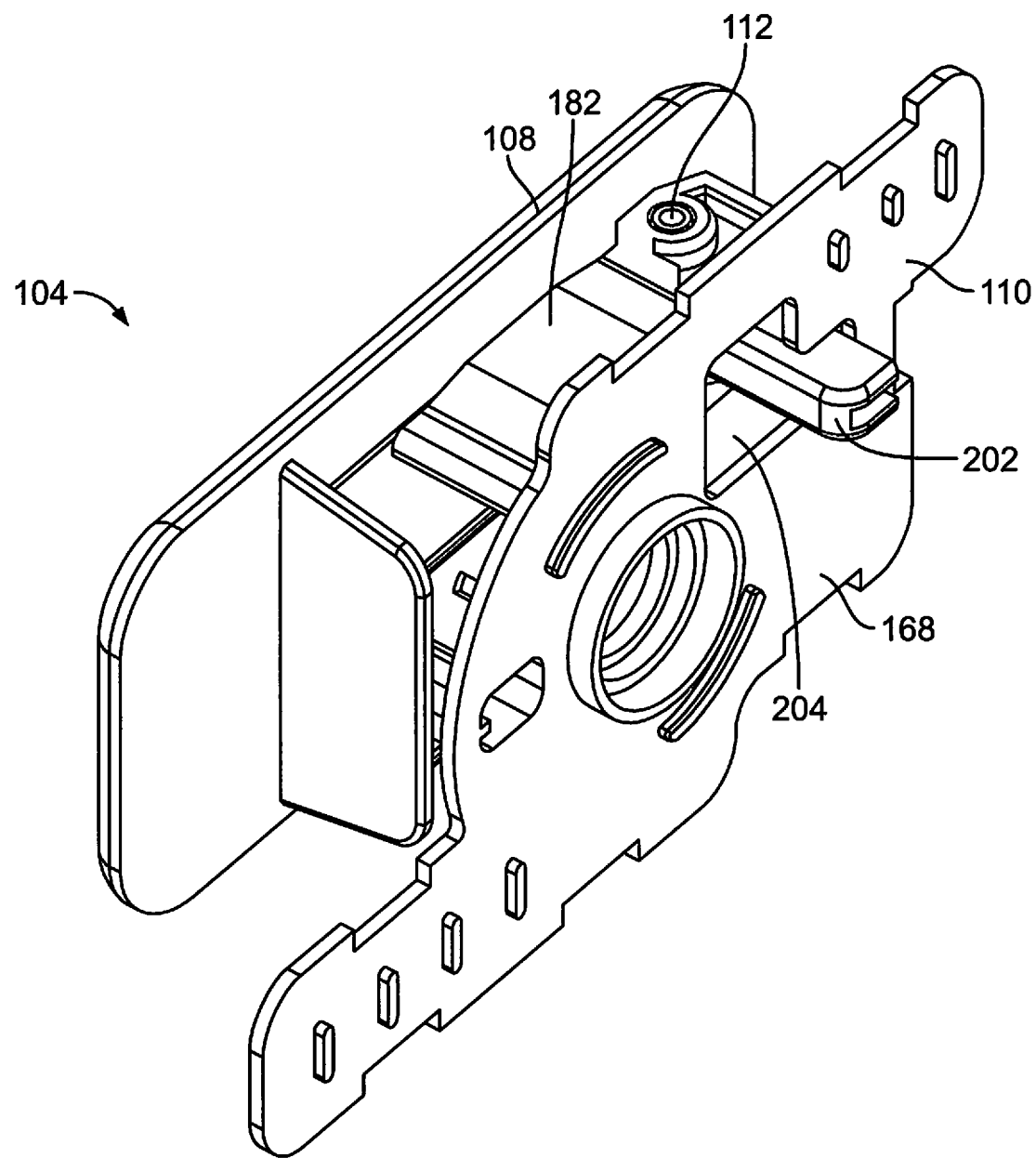
FIG. 9 illustrates a perspective rear view of a lid sub-assembly, according to an embodiment of the present disclosure.

FIG. 9 illustrates a perspective rear view of the lid sub-assembly 104, according to an embodiment of the present disclosure. The lid sub-assembly 104 includes the handle 108 pivotally coupled to the covering lid 110 via the pivot pin 112. As shown in FIG. 9, the handle 108 is in a closed position relative to the covering lid 110. When the handle 108 is in the closed position, portions of the boundary wall 182 overlay portions of the upper wall 150 and/or the lower wall 152 (shown in FIG. 4). Further, a distal end 202 of the stem 158 extends through a stem opening 204 formed through the covering panel 168 of the covering lid 110.

Figure 10:
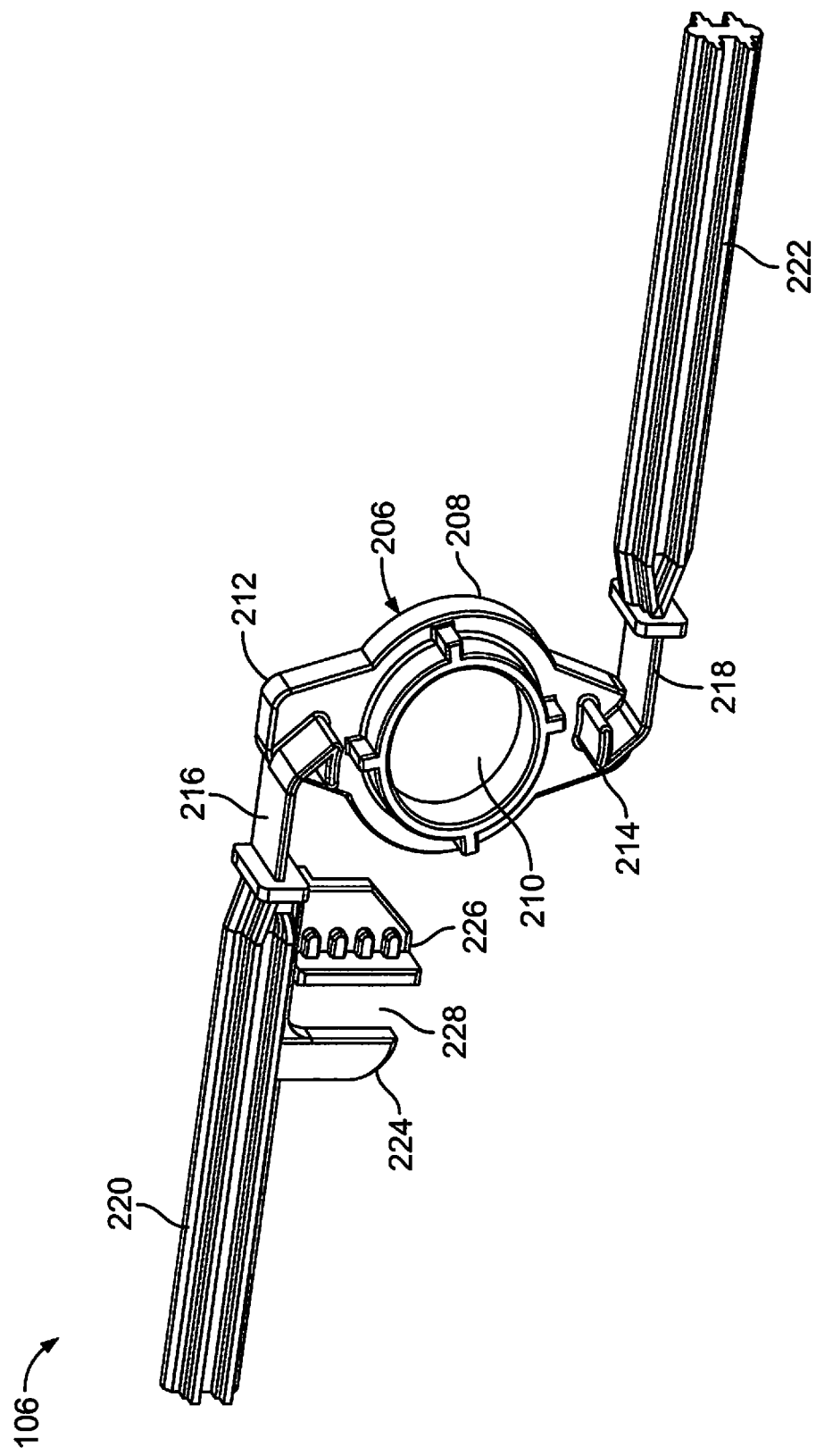
FIG. 10 illustrates a perspective front view of a cam, according to an embodiment of the present disclosure.

FIG. 10 illustrates a perspective front view of the cam 106, according to an embodiment of the present disclosure. The cam 106 may formed of a resilient material, such as rubber, injection-molded resin, or other such elastomeric material. The cam 106 includes a central hub 206 including an annular collar 208 defining a central opening 210. An upper extending fin 212 and a lower extending fin 214 may extend from the collar 208 opposite from one another (for example, 180 degrees from one another). A first living hinge 216 extends from the upper extending fin 212 (which disposes the first living hinge 216 at a particular height), while a second living hinge 218 extends from the lower extending fin 214 (which disposes the second living 218 at a particular height). The first living hinge 216 and the second living hinge 218 extend in opposite directions. The first living hinge 216 also connects to a first leg 220 at an opposite end from the upper fin 212, while the second living hinge 218 also connects to a second leg 222 at an opposite end from the lower fin 214. Clamping prongs 224 and 226 separated by a gap 228 extend downwardly from the first leg 220 proximate to the first living hinge 216. As shown, the first living hinge 216 and the second living hinge 218 may be thinned resilient pieces of material, such as thinned straps. The first and second living hinges 216 and 218 allow for a simple and efficient securing assembly. Optionally, the first and second living hinges 216 and 218 may directly couple to the collar 208 of the central hub 206 without the fins 212 and 214.

As shown, the cam 106 includes the first leg 220 and the second leg 222 connected to the central hub 206 by the first living hinge 216 and the second living hinge 218. Optionally, the cam 106 may include more or less legs and living hinges than shown. For example, the cam 106 may include a single leg that connects to the central hub 206 through a single living hinge. As another example, the cam 106 may include three or more legs connected to the central hub 206 through three or more living hinges.

Figure 11:
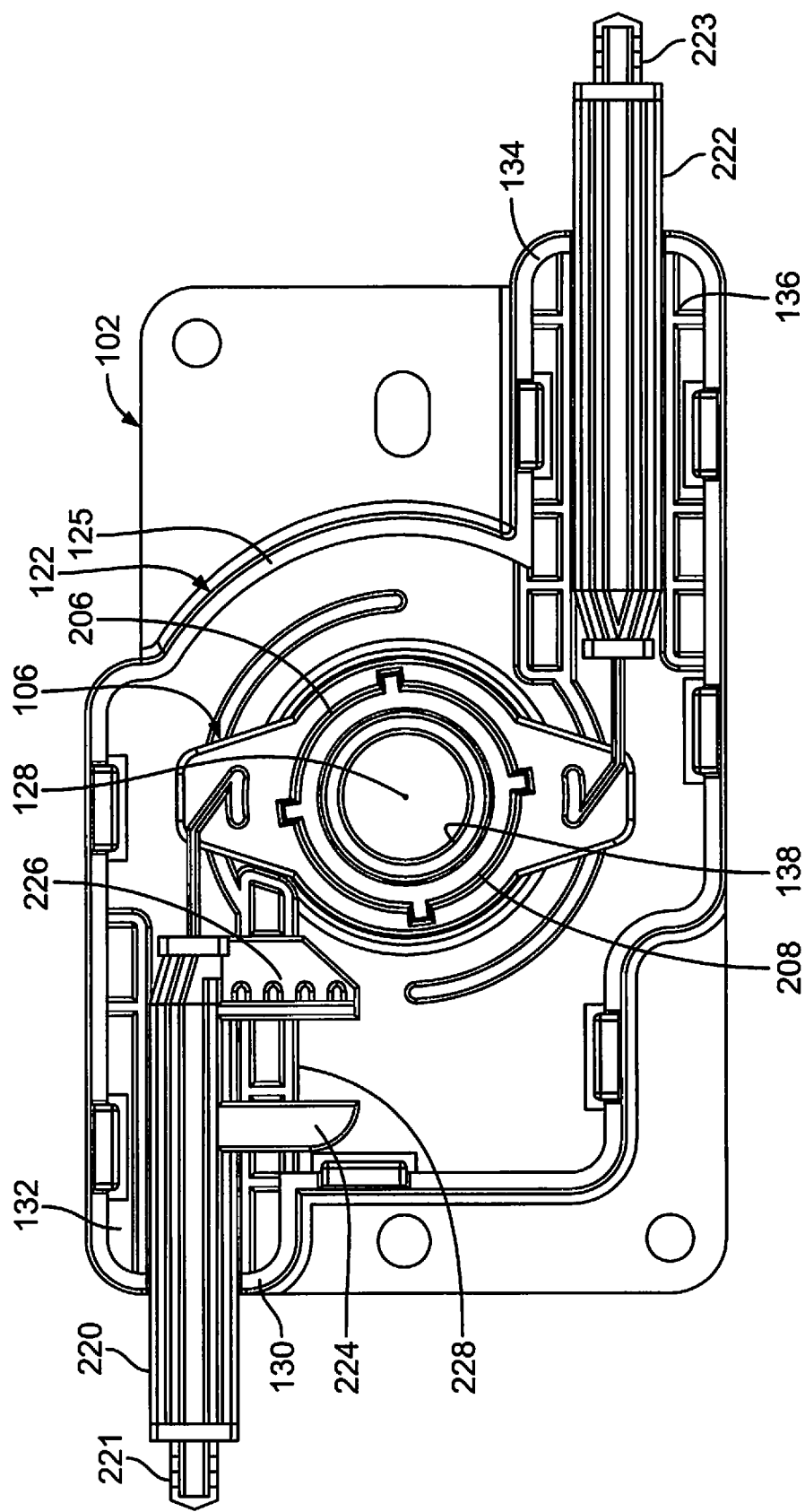
FIG. 11 illustrates a front view of the cam disposed within the housing, according to an embodiment of the present disclosure.

FIG. 11 illustrates a front view of the cam 106 disposed within the housing 102. The cam 106 is retained within the cam-retaining chamber 124 by the retaining wall 122. As shown in FIG. 11, the cam 106 is in an at-rest position within the cam-retaining chamber 124. The central hub 206 is within the cam hub retaining area 128 defined by the central hub portion 125, the first leg 220 includes a portion retained within the first leg retaining area 132 defined by the first leg portion 130, and the second leg 222 includes a portion retained within the second leg retaining area 136 defined by the second leg portion 134. As shown, the first leg 220 and the second leg 222 have exposed latch ends 221 and 223, respectively, that may extend out of retaining wall 122. The annular collar 208 of the central hub 206 of the cam 106 fits around the central boss 138, such as via an interference fit. The central boss 138 centers the cam 106 in relation to the housing 102, and provides a rotational pivot for the cam 106, so as to move the first and second legs 220 and 222 inwardly and/or outwardly via the first and second living hinges 216 and 218.

Figure 12:
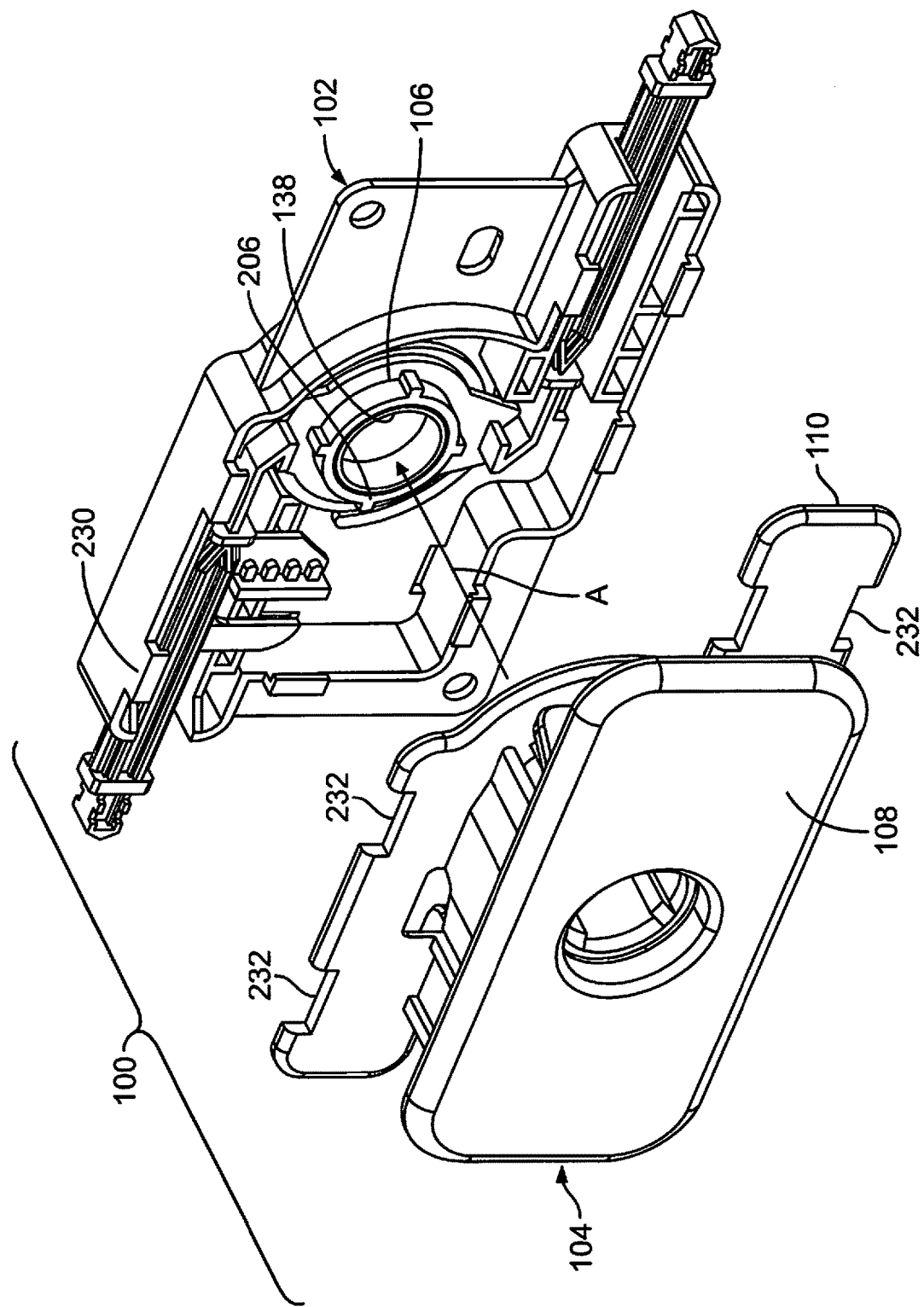
FIG. 12 illustrates a perspective front view of the lid sub-assembly aligned with the housing, according to an embodiment of the present disclosure.

FIG. 12 illustrates a perspective front view of the lid sub-assembly 104 aligned with the housing 102, according to an embodiment of the present disclosure. In order to secure the lid sub-assembly 104 to the housing 102, the central rim 180 (shown in FIG. 5) of the lid sub-assembly 104 is axially aligned with central boss 138 of the housing 102 (around which the central hub 206 of the cam 106 is positioned), and the lid sub-assembly 104 and the housing 102 are mated together in the direction of arrow A. The housing 102 includes one or more detents 230 (such as tabs, barbs, clasp, clips, or the like) that are received and retained by one or more reciprocal slots 232 formed in the covering lid 110, thereby securely coupling the lid sub-assembly 104 to the housing 102. As such, the cam 106 is moveably retained between the housing 102 and the lid sub-assembly 104. Optionally, the housing 102 may include the slots, while the covering lid 110 includes the detents. In at least one embodiment, instead of (or in addition to) the detents and the slots, the lid sub-assembly 104 may securely couple to the housing 102 through adhesives, one or more fasteners, and/or in any other suitable manner.

Figure 13:
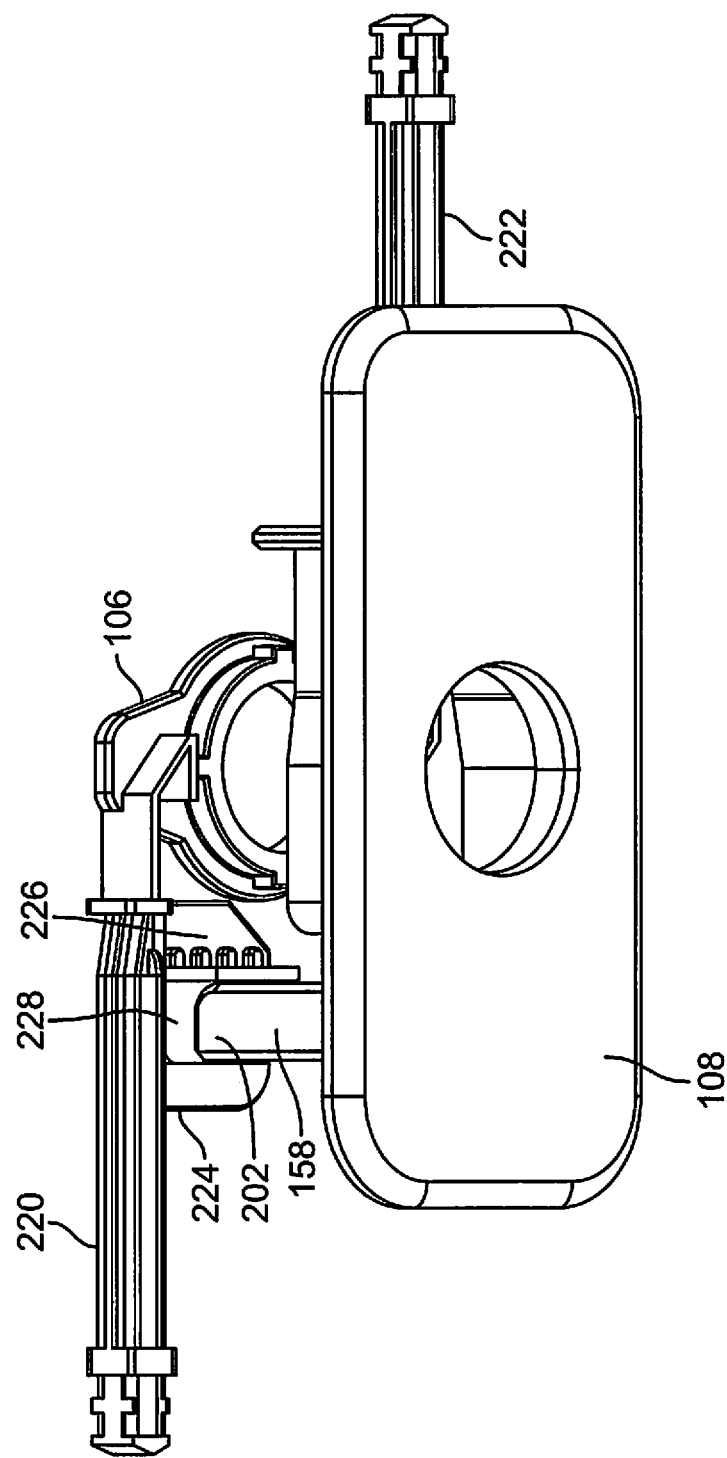
FIG. 13 illustrates a perspective top view of clamping prongs of the cam securing to a stem of the handle, according to an embodiment of the present disclosure.

FIG. 13 illustrates a perspective top view of the clamping prongs 224 and 226 of the cam 106 securing to the stem 158 of the handle 108, according to an embodiment of the present disclosure. Referring to FIGS. 1, 2, 4, 5, 9-12, and 13, when the handle 108 is in the closed position relative to the covering lid 110 such that the distal end 202 of the stem 158 extends through the stem opening 204 of the covering lid 110, the clamping prongs 224 and 226 of the cam 106 clamp onto the distal end 202 of the stem 158.

Figure 14:
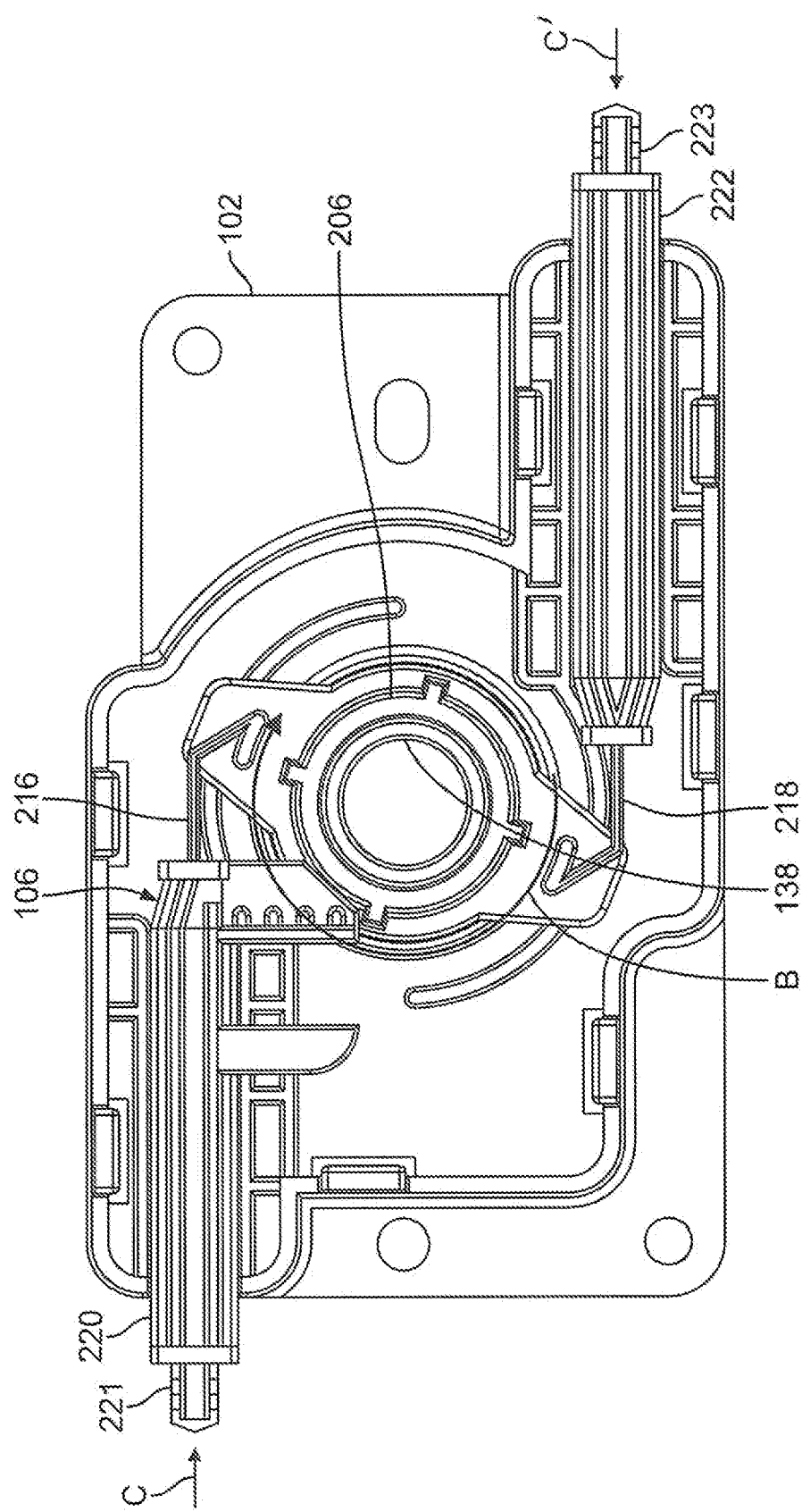
FIG. 14 illustrates a front view of the cam rotated within the housing, according to an embodiment of the present disclosure.
Figure 15:
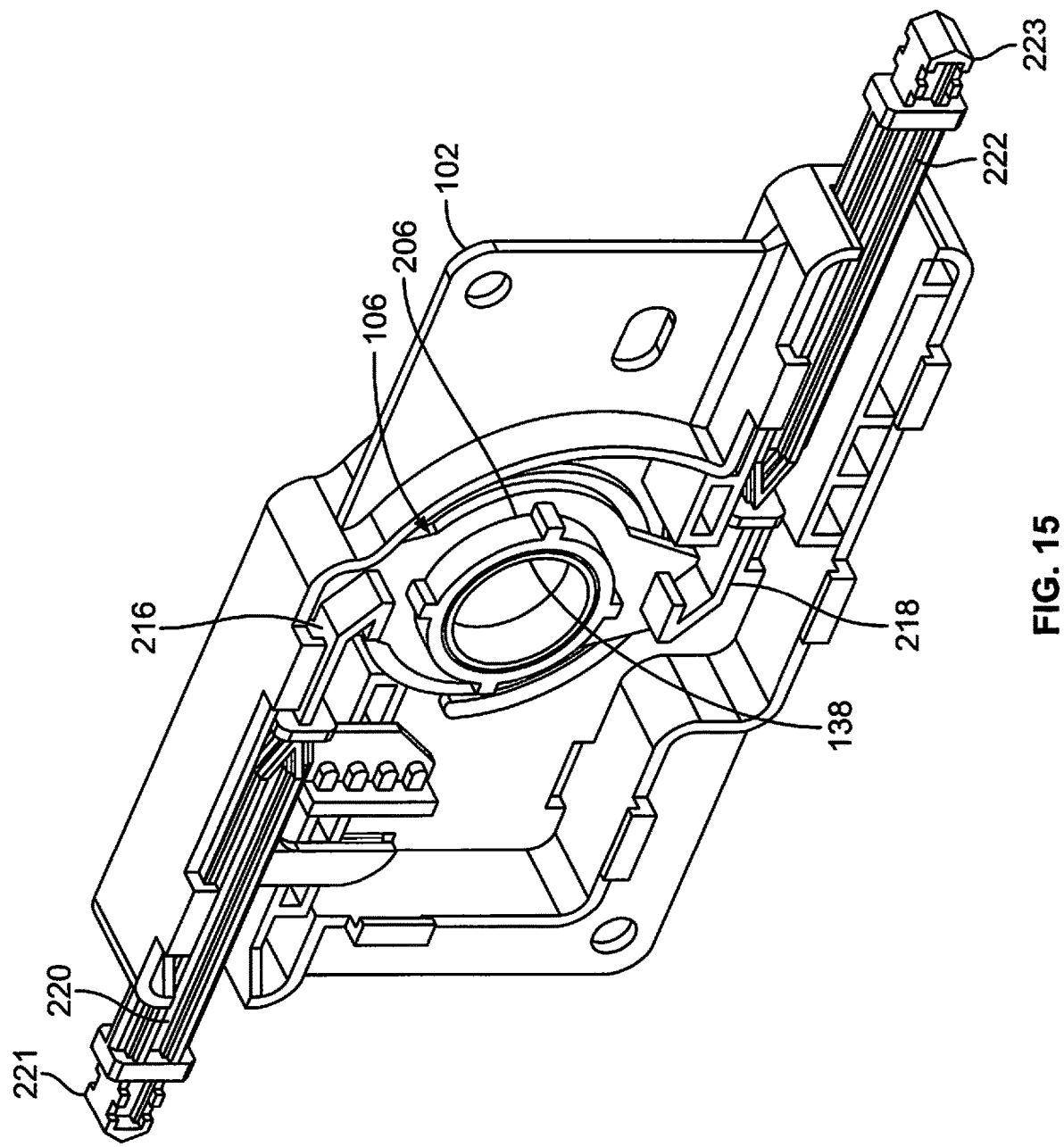
FIG. 15 illustrates a perspective front view of the cam in an at-rest position within the housing, according to an embodiment of the present disclosure.
Figure 16:
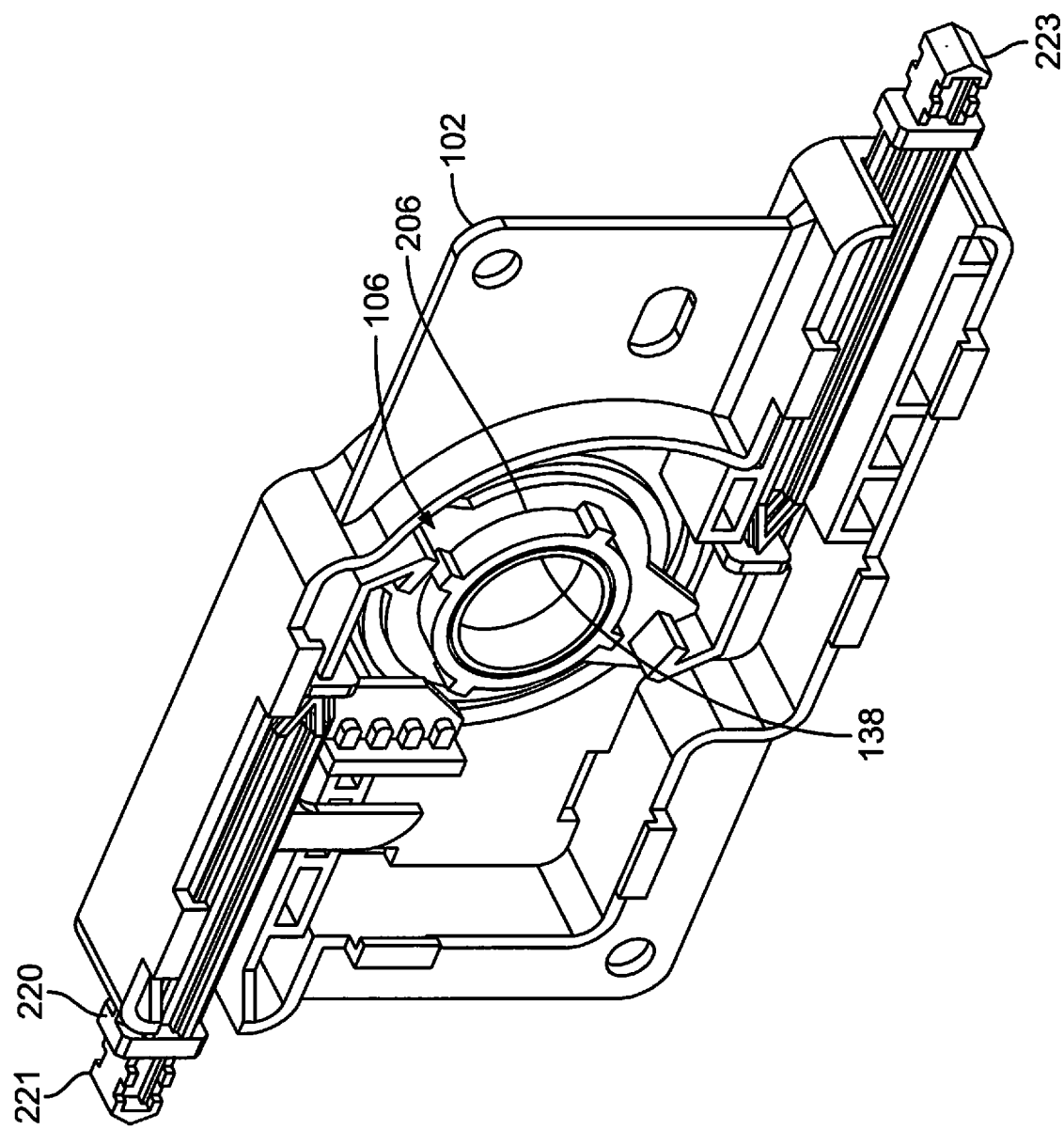
FIG. 16 illustrates a perspective front view of the cam in an inwardly-rotated position, according to an embodiment of the present disclosure.

FIG. 14 illustrates a front view of the cam 106 rotated within the housing 102. FIG. 15 illustrates a perspective front view of the cam 106 in an at-rest position within the housing 102. FIG. 16 illustrates a perspective front view of the cam 106 in an inwardly-rotated position. Referring to FIGS. 14-16, as the central hub 206 of the cam 106 is rotated about the central boss 138 in the direction of arc B (shown in FIG. 14), the central hub 206 pulls on the first leg 220 via the flexible and resilient first living hinge 216 in the direction of arrow C, while simultaneously pulling on the second leg 222 via the flexible and resilient second living hinge 218 in the direction of arrow C', which is opposite from the direction of arrow C. Accordingly, a clockwise rotation of the central hub 206 in the direction of arrow B causes corresponding linear motion of the first leg 220 and the second leg 222 in the directions of arrows C and C', respectively, via the first living hinge 216 and the second living hinge 218, respectively, thereby drawing the exposed latch ends 221 and 223, respectively, towards the housing 102. Conversely, a rotation of the central hub 206 in a direction that is opposite from arc B causes the first leg 220 and the second leg 222 to move via the first living hinge 216 and the second living hinge 218, respectively, back towards the at-rest position, as shown in FIG. 11.

Figure 17:
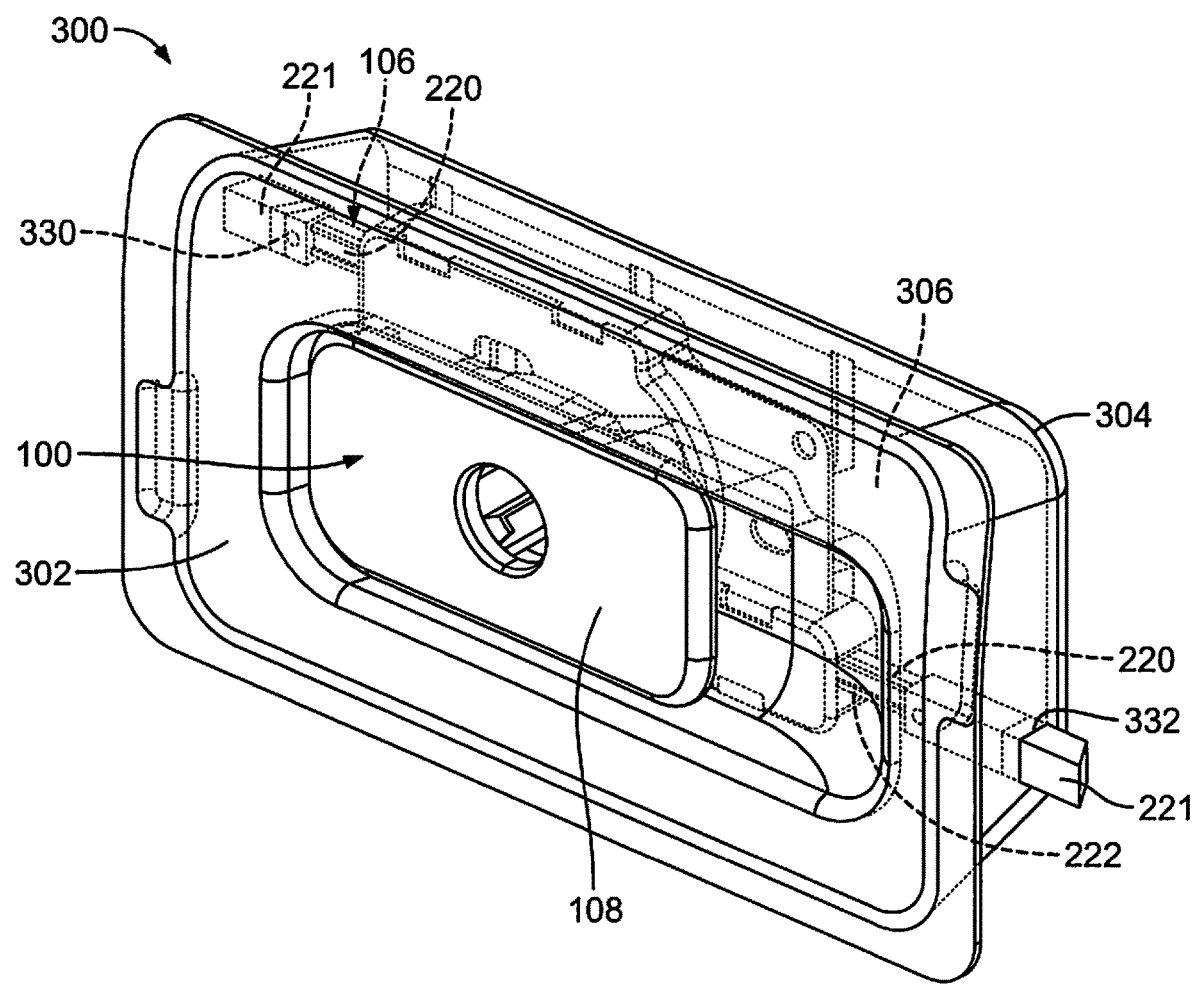
FIG. 17 illustrates a compartment having a door in a closed position, according to an embodiment of the present disclosure.

FIG. 17 illustrates a compartment 300 having a cover, such as a door 302, in a closed position, according to an embodiment of the present disclosure. Portions of the door 302 are shown transparent in order to show portions of the compartment cover release system 100 and the compartment 300. The door 302 is pivotally coupled to a main retaining housing 304, which defines an internal retaining chamber 306. The compartment cover release system 100 is secured to the door 302. When the compartment cover release system 100 is in the closed position (such that the cam 106 is in an at-rest position), the latch ends 221 and 223 of the first leg 220 and the second leg 222 are retained within reciprocal latching members 330 and 332 (such as channels, sleeves, or the like) of the main retaining housing 304, thereby ensuring that the door 302 remains closed with respect to the main retaining housing 304.

Figure 18:
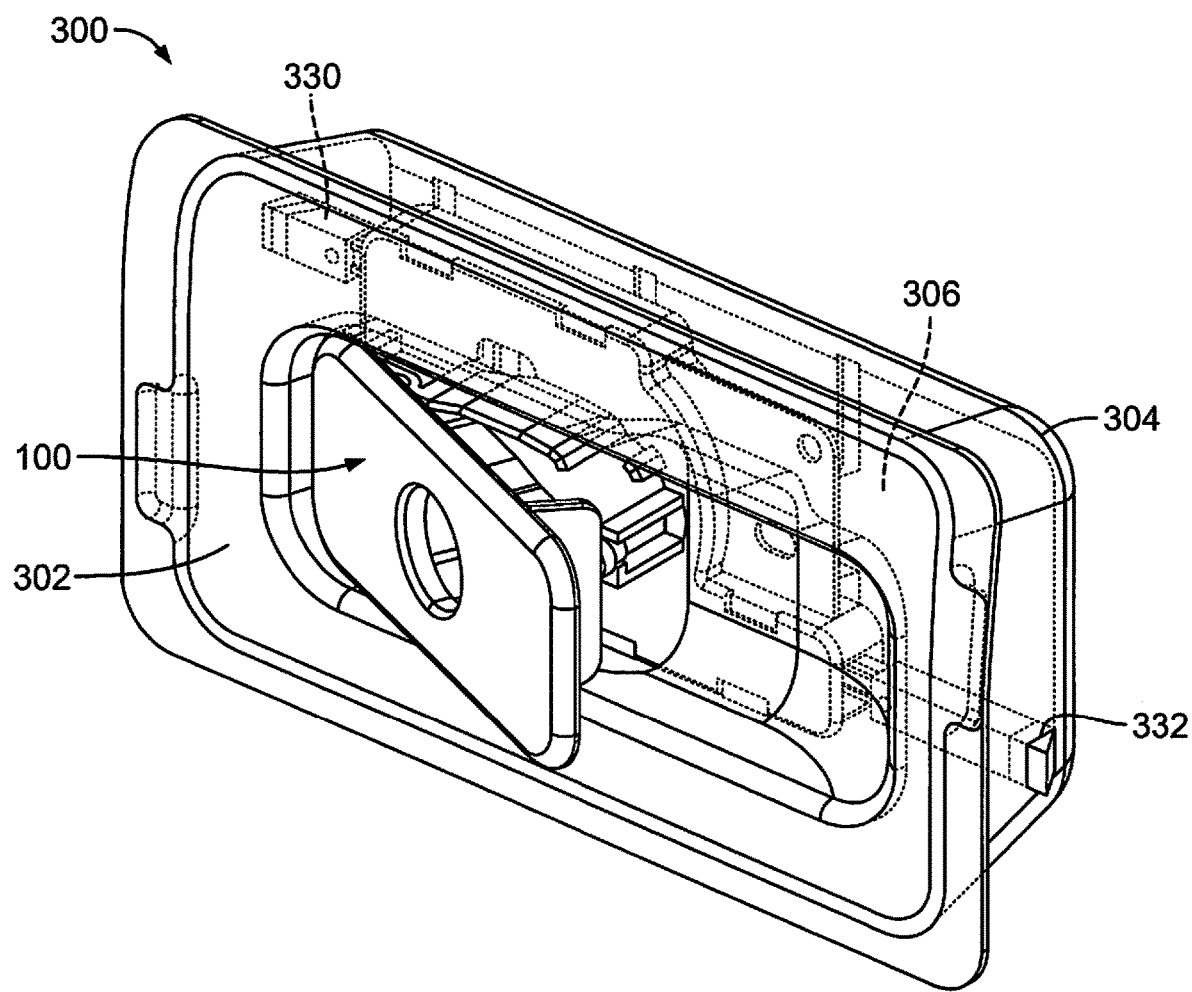
FIG. 18 illustrates the compartment in which the compartment cover release system is in an open position, according to an embodiment of the present disclosure.

FIG. 18 illustrates the compartment 300 in which the compartment cover release system 100 is in an open position. Referring to FIGS. 1-18, in order to open the door 302, the handle 108 of the lid sub-assembly 104 is pivoted into an open position, as shown in FIG. 18. As the handle 108 is pivoted into the open position (such as by an individual grasping and pivoting the handle 108), one or both of the clamping prongs 224 and 226 release from the distal end 202 of the stem 158 (shown in FIG. 13). As such, the central hub 206 is now allowed to rotate relative to the central boss 138, as shown in FIG. 14. With continued pivotal rotation of the handle 108 relative to the covering lid 110, the central hub 206 (now unrestrained by the clamping prongs 224 and 226 engaging the stem 158), automatically rotates, thereby drawing in the first leg 220 and the central leg 222 so as to release the respective latch ends 221 and 223 from the reciprocal latching members 330 and 332. As such, the door 302 is no longer latched to the main retaining housing 304, and may therefore be opened.

In at least one embodiment, as the handle 108 is pivoted into an open position, the stem 158 pushes on the inner clamping prong 226, which forces the central hub 206 of the cam 106 to rotate about the central boss 138. As the central hub 206 rotates about the central boss 138, the central hub 206 inwardly pulls both the first and second legs 220 and 222, thereby releasing the latch ends 221 and 223 from the reciprocal latching members 330 and 332. The inwardly-directed force exerted by the central hub 206 on the first and second legs 220 and 222 forces the first and second legs 220 and 222 to slide against portions of the retaining wall 122 (such as the respective portions 130 and 134), which then forces the first and second legs 220 and 222 to move in horizontal directions (in relation to the orientation shown in FIGS. 14-16, for example). The first and second living hinges 216 and 218 flex or otherwise move to allow the first and second legs 220 and 222 to move to allow the door 302 to be opened. Without the living hinges 216 and 218, at least two extra components and a complex ball and joint assembly would likely be needed to provide the same results.

When the handle 108 is released, the spring 114 in the lid sub-assembly 104 forces the handle 108 back to the closed position, thereby causing the cam 106 to move back to the at-rest position (as shown in FIGS. 11 and 15). During such pivotal motion that moves the handle 108 to the closed position, the stem 158 of the handle 108 pushes the outer clamping prong 224 to rotate the central hub 206 so that the first and second legs 220 and 222 are again engaged by the reciprocal latching members 330 and 332, thereby latching the door 302 to the main retaining housing 304.

The compartment cover release system 100 couples to the compartment 300, and is configured to selectively latch and unlatch a door or other such cover of the compartment 300. For example, the compartment cover release system 100 is configured to be coupled to the door 302. The compartment cover release system 100 includes the handle 108, which may be pivoted between a closed position and an open position. In the closed position, the cam 106 is in an at-rest position, such that the latch ends 221 and 223 of the first leg 220 and the second leg 222, respectively, are retained by the reciprocal latching members 330 and 332, respectively. As the handle 108 is pivoted into the open position, the cam 106 draws the first leg and the second leg 222 inwardly via the first and second living hinges 216 and 218 such that the latch ends 221 and 223 are released from the reciprocal latching members 330 and 332, thereby allowing the door 302 to be opened.

Embodiments of the present disclosure provide a compartment cover release system 100 that is configured to selectively latch and unlatch a cover (such as the door 302) of a compartment 300. In at least one embodiment, the compartment cover release system 100 includes a housing 102, and a lid sub-assembly 104 coupled to the housing 102. The lid sub-assembly 104 includes a handle 108 that is configured to be pivoted between an open position and a closed position. A cam 106 is coupled to one or both of the housing 102 and the lid sub-assembly 104. The cam 106 includes a central hub 206 connected to one or more legs 220 and/or 222. The leg(s) 220 and/or 222 are configured to move in response to rotation of the central hub 206. In at least one embodiment, the central hub 206 rotates as the handle 108 is moved between the open position and the closed position.

The compartment cover release system 100 includes the cam 106, which provides a single cam releasing mechanism. The compartment cover release system 100 provides an efficient and relatively simple assembly as compared to known complex assemblies having many more parts.

As described herein, embodiments of the present disclosure provide a compartment cover release system and method that includes a cam having operative legs and one or more living hinges. The compartment cover release system provides an efficient, simplified assembly that is easier to assemble, and has less parts than prior known cover release assemblies.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A compartment cover release system that is configured to selectively latch and unlatch a cover of a compartment, the compartment cover release system comprising:
   a housing;
   a lid sub-assembly coupled to the housing, the lid sub-assembly comprising a handle that is configured to be pivoted between an open position and a closed position; and
   a cam coupled to one or both of the housing and the lid sub-assembly, the cam comprising a central hub connected to one or more legs, wherein the one or more legs are configured to move in response to rotation of the central hub,
   wherein the one or more legs comprise clamping prongs that are configured to securely engage a portion of the handle in the closed position.

2. The compartment cover release system of claim 1, wherein the central hub is configured to rotate as the handle pivots between the open position and the closed position.

3. The compartment cover release system of claim 1, wherein the one or more legs comprises a first leg and a second leg.

4. The compartment cover release system of claim 1, wherein the cam further comprises one or more living hinges that connect the central hub to the one or more legs.

5. The compartment cover release system of claim 1, wherein the lid sub-assembly further comprises a covering lid, wherein the handle is pivotally coupled to the covering lid.

6. The compartment cover release system of claim 5, wherein a stem of the handle extends through a stem opening formed through a covering panel of the covering lid when the handle is in the closed position.

7. The compartment cover release system of claim 1, wherein the lid sub-assembly further comprises a spring that is configured to bias the handle into the closed position.

8. The compartment cover release system of claim 1, wherein the lid sub-assembly further comprises a bumper that contacts the handle in the closed position.

9. The compartment cover release system of claim 1, wherein the housing comprises:
   a retaining wall including a central hub portion that defines a cam hub retaining area that retains the central hub, and one or more leg portions that define one or more leg retaining areas that retain the one or more legs; and
   a central boss, wherein the central hub is rotatably secured around the central boss.

10. The compartment cover release system of claim 1, wherein the portion of the handle comprises a distal end of a stem.

11. The compartment cover release system of claim 1, wherein the one or more legs comprise one or more latch ends that are configured to be retained by one or more reciprocal latching members of the compartment when the handle is in the closed position.

12. A compartment comprising:
   a main retaining housing defining an internal retaining chamber;
   a door moveably coupled to the main retaining housing; and
   a compartment cover release system coupled to one or both of the main retaining housing and the door, the compartment cover release system being configured to selectively latch and unlatch the door in relation to the main retaining housing, the compartment cover release system comprising:

a housing;

a lid sub-assembly coupled to the housing, the lid sub-assembly comprising a handle that is configured to be pivoted between an open position and a closed position, wherein the door is unlatched when the handle is in the open position; and a cam coupled to one or both of the housing and the lid sub-assembly, the cam comprising a central hub connected to one or more legs, wherein the one or more legs are configured to move in response to rotation of the central hub, wherein the lid sub-assembly further comprises a bumper that contacts the handle in the closed position.

13. The compartment of claim 12, wherein the central hub is configured to rotate as the handle pivots between the open position and the closed position.

14. The compartment of claim 12, wherein the cam further comprises one or more living hinges that connect the central hub to the one or more legs.

15. The compartment of claim 12, wherein the lid sub-assembly further comprises a covering lid, wherein the handle is pivotally coupled to the covering lid.

16. The compartment of claim 12, wherein the one or more legs comprise clamping prongs that are configured to securely engage a distal end of a stem of the handle in the closed position.

17. The compartment of claim 12, wherein the one or more legs comprise one or more latch ends that are configured to be retained by one or more reciprocal latching members of the compartment when the handle is in the closed position.

18. A compartment cover release system that is configured to selectively latch and unlatch a cover of a compartment, the compartment cover release system comprising:

a housing having a central boss;

a lid sub-assembly coupled to the housing, the lid sub-assembly comprising:

a handle that is configured to be pivoted between an open position and a closed position relative to a covering lid, wherein a stem of the handle extends through a stem opening formed through the covering panel when the handle is in the closed position;

a spring that is configured to bias the handle into the closed position; and a bumper that contacts the handle in the closed position; and a cam coupled to one or both of the housing and the lid sub-assembly, the cam comprising:

a central hub rotatably coupled to the central boss; and one or more legs extending from the central hub, wherein the one or more legs are configured to move in response to rotation of the central hub, wherein the central hub is configured to rotate as the handle pivots between the open position and the closed position, and wherein the one or more legs comprise clamping prongs that are configured to securely engage a distal end of the stem of the handle in the closed position, and one or more latch ends that are configured to be retained by one or more reciprocal latching members of the compartment when the handle is in the closed position.

19. The compartment cover release system of claim 18, wherein the one or more legs comprises a first leg and a second leg, and wherein the cam further comprises a first living hinge and a second living hinge that connect the central hub to the first leg and the second leg, respectively.

* * * * *